Jan. 8, 1946.  L. I. KAPLAN ET AL  2,392,481
MACHINE TOOL CUTTER
Filed Dec. 26, 1941

INVENTORS
BROR GUSTAF VON REIS
LEO I. KAPLAN
Attorney

UNITED STATES PATENT OFFICE 2,392,481

MACHINE TOOL CUTTER

Leo I. Kaplan and Bror Gustaf von Reis, Detroit, Mich., assignors to Detroit Broach Company, Detroit, Mich., a corporation of Michigan Application December 26, 1941, Serial No. 424,502

3 Claims. (Cl. 29—95.1)

This invention relates to machine tool cutters, and has for its object to provide an improved shape of tooth which will take a cleaner cut, which will leave a smoother surface behind the cut, which will roll the chip to a very large extent thus reducing fracturing off of small particles and which will function with reduced generation of heat in the work and in the tool. Since the tooth was developed with particular reference to a broach this type machine tool should be borne particularly in mind.

As a tool cutter is forced through work the high friction between the tool face and the compressed material adjacent the tool face, with the high temperature and high specific pressure necessarily present, there is a layer of material which generally clings to the tool face to form what is known as a built-up edge. This built-up edge is, therefore, forced through the work by the cutter face and does the actual fracturing or cutting. The chip body shears away from this built-up edge and passes off above.

As the built-up edge becomes larger and larger it becomes more and more unstable until fragments thereof are torn off. The built-up edge is, therefore, continually varying in size and attacking the area of fracture or shear with a varying area which causes roughness. Furthermore, as the built-up edge increases in size the chip being formed and following upwardly of the tool face is subjected to a bend of increasing curvature which would remain at a substantially constant value if the built-up edge can be kept at a reduced size.

The conventional tool face is theoretically straight—that is, it is straight when it is new but with increased use it really becomes convex since the cutting edge recedes. The principal object of this invention, therefore, is to provide an improved shape of tool or cutter face which will be such that a more rapid disintegration of the built-up edge will take place and that edge will therefrom remain small and more nearly of constant size with the resultant flow of advantages as above indicated.

A better understanding of the invention will be had with reference to the accompanying drawing, in which Fig. 1 shows a transverse section through a series of cutters shaped according to our invention, and which might form part of a broach or of a milling cutter or other similar machine tool together with a piece of work on which it is functioning.

Figure 1:
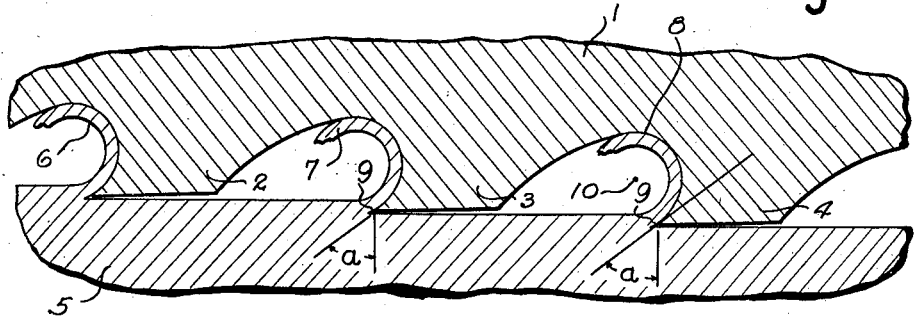

More particularly, 1 indicates a tool body which might be the body of a broach, a milling machine cutter, a planer or any other similar tool. Formed integral with the tool body 1 is a series of cutters 2, 3 and 4 of varying depth. The cutter 2 shears the work 5, taking off a portion of the surface and curling it upwardly into a chip 6. The cutter 3 then shears a further portion of the work which it curls upwardly into a chip 7, and so on, it being understood that the tool may have a length of several feet with a large number of cutters. The chips 6, 7 will roll themselves into a tight bundle which may break off at intervals so that the space between cutters must be large enough to accommodate all chips during any pass of the tool through the work, or a tool of special design is necessary to permit expulsion thereof during working.

The conventional cutter face is composed of a curved portion at its base, usually the arc of a circle, and a straight side wall generally at a tangent to the arc of the circle at the base. This flat face lies in a plane which may intersect the surface of the outer face of the cutter at a right angle, or at an obtuse angle or at an oblique angle depending on the class of work for which the tool is designed.

Each cutter here illustrated is formed on the arc of a circle from its base or line of greatest depth 8 to its cutting edge 9. In Fig. 1 the center 10 is at approximately half the depth of the tooth since it is at a distance from the point 8 substantially equal to half the distance of the point 8 from a plane containing the cutting edges 9.

Figure 2:
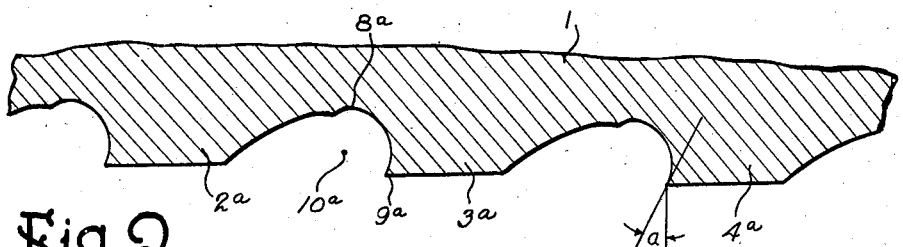
Fig. 2 is a view similar to Fig. 1 showing the application of our invention to a similar cutter intended for other work, without the work.

The showing of Fig. 2 is similar to that tool of Fig. 1, the cutters 2a, 3a and 4a corresponding to the cutters 2, 3 and 4. The difference between these forms is that the center 10a of the arc 8a, 9a is in a position substantially less than half the depth of the cutter, for a different class of work.

Figure 3:
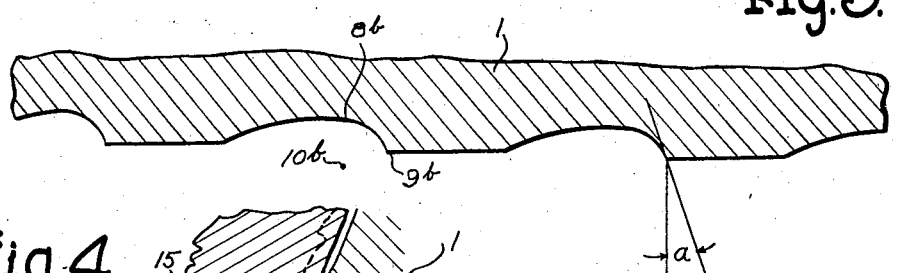
Fig. 3 is a view similar to Figs. 1 and 2 showing the application of our invention to a similar cutter for still different kind of work, also without the work.

In Fig. 3 the cutters 2b, 3b and 4b correspond to the cutters 2, 3 and 4, but the center 10b of the arc 8b, 9b is outside the contour of the cutters, for work on very soft metals.

In these illustrations substantially the same radius is used and the position of the center has been varied. This varies the length of the arc and also the rake angle. The center may remain constant and the length of radius varied. Or, both may be varied, and in each variation a different tooth or cutter will be formed. Thus, the radius may be said to be variable as to length and the center of the arc variable as to depth in the tooth or cutter. It will be seen that the angle $a$ may be varied by varying the position of the center of the arcs. This angle is formed by a tangent to the cutting face at its cutting point and a line intersecting it normal to the work cut. It is known as the rake angle, the hook angle, the undercut angle and by other designations.

Figures 4, 5:
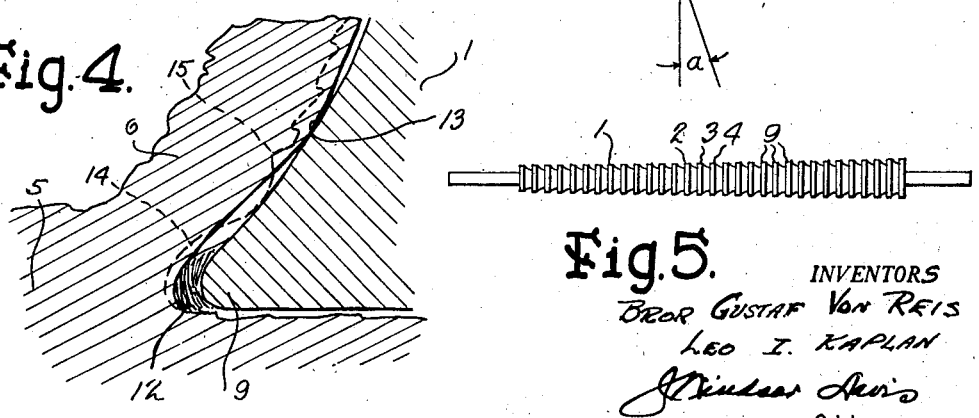
Fig. 4 is similar to a micro-photograph showing the action of our improved cutter while doing work.
Fig. 5 is a longitudinal view of the broach spindle.

Fig. 4 shows a greatly enlarged view of the cutting edge 9 of our improved cutter shearing a chip 6 from the work 5. In the enlarged view the edge 9, which is in reality a sharp cutting edge, appears rounded and between the edge and the line of fracture of the chip 6 is a highly compressed mass 12 which is separate from the chip 6 and which is known as the built-up edge. The cutter forces this built-up edge ahead of itself so it actually causes the fracture or shear. This edge builds up and crumbles away and again builds up through a continuous process. By curving that portion 13 of the cutter face immediately above the edge 9 rearwardly, as shown and explained, it is seen that the chip 6 follows the face 13 without the double bend which would be caused by a larger built-up edge.

With a conventional cutter having a flat or slightly convex face the build-up would be of the order of that indicated by the dotted line 14 and the chip would follow the dotted lines 15 causing a bend in the chip. A reduction in size of built-up edge evidently reduces the heat generated in the cutting and results, generally, in better cutting.

What we claim is:

1. A broaching tool for broaching the interior of a cylindrical barrel composed of a spindle having a linear series of cutting teeth, each tooth in said series having a cutting edge and being of substantial depth, and each tooth having a tooth face concaved on the arc of a circle having a radius at least as great as the depth of said tooth.

2. A broaching tool for broaching the interior of a cylindrical barrel composed of a spindle having a linear series of cutting teeth, each tooth in said series having a cutting edge and being of substantial depth, and each tooth having a tooth face concaved on the arc of a circle having a radius greater than the depth of said tooth.

3. A broaching tool for broaching the interior of a cylindrical barrel composed of a spindle having a linear series of cutting teeth, each tooth in said series having a cutting edge and being of substantial depth, and each tooth having a tooth face concaved on the arc of a circle having its center at a point outwardly of the contour of the tooth.

LEO I. KAPLAN.
BROR GUSTAF von REIS.